April 8, 1924.

W. J. O'LEARY

MULTIPLE DRIVE MOTOR

Filed Aug. 6, 1918    2 Sheets-Sheet 1

William J. O'Leary
Inventor

George Ramsey
By      Attorney

April 8, 1924.
W. J. O'LEARY
1,489,848
MULTIPLE DRIVE MOTOR
Filed Aug. 6, 1918    2 Sheets-Sheet 2
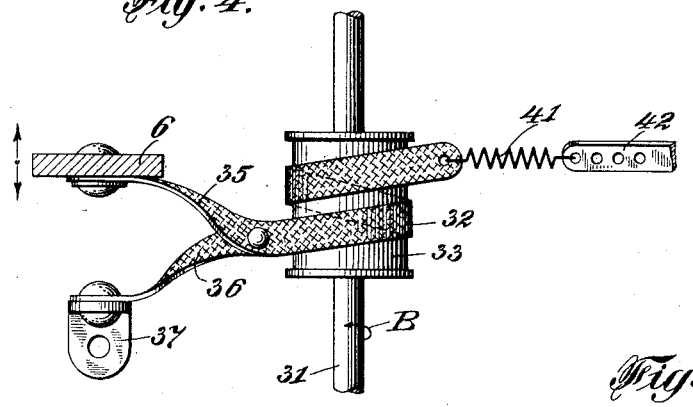
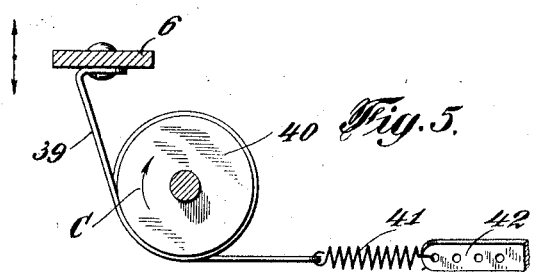
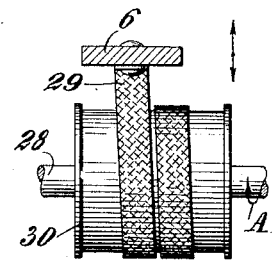
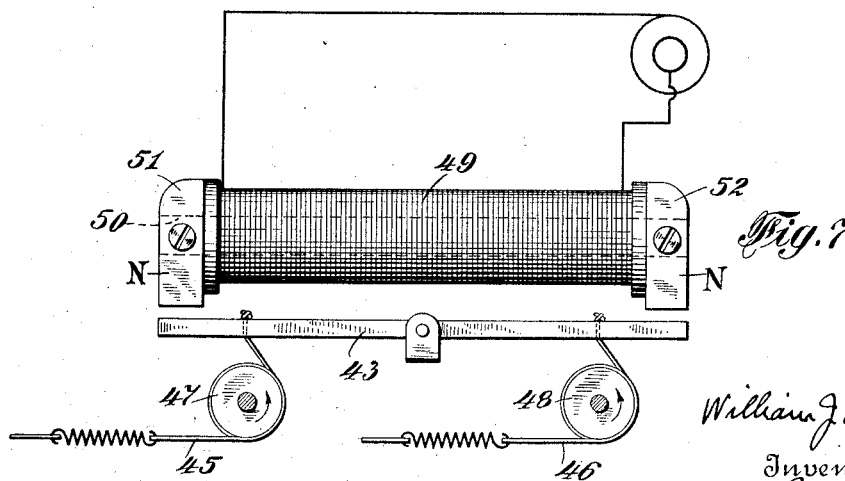
William J. O'Leary
Inventor
George Ramsey
By Attorney Patented Apr. 8, 1924.

1,489,848

UNITED STATES PATENT OFFICE.

WILLIAM J. O'LEARY, OF MONTREAL, CANADA, ASSIGNOR TO MARGUERITE V. O'LEARY, OF MONTREAL, QUEBEC, CANADA.

MULTIPLE-DRIVE MOTOR.

Application filed August 6, 1918. Serial No. 248,606.

*To all whom it may concern:*

Be it known that I, WILLIAM J. O'LEARY, a subject of the King of England, residing at Montreal, Dominion of Canada, have made a certain new and useful invention in Multiple-Drive Motors, of which the following is a specification.

This invention relates to motors, and the particular embodiment thereof herein disclosed is more especially adapted for toy motors.

The principal object of the present invention is to provide a prime mover constructed to deliver power directly, without the intermediation of gearing, to shafts arranged with their axes in any of the three dimensions.

Another object of the present invention is a motor of the vibrating type wherein transmission bands are so provided and constructed as to be capable of driving driven shafts the axes of which are or may be at diverse angles relatively to the said vibrating member.

Another object of the present invention is to provide an electric motor or the like wherein a plurality of shafts, with the axes thereof angularly disposed one to another, may be simultaneously driven without intermediation of driving gears.

A still further object of the present invention is to provide a motor as specified, wherein a plurality of shafts angularly disposed one to another may be driven at different rates of speed or at variable rates of speed, from the same driving means and without the intermediation of gearing.

The present invention possesses many other advantageous features, some of which, with the foregoing, will be set forth more at length in the following description, wherein will be outlined in full that form of invention which I have selected for illustration in the drawings accompanying and forming a part of the present specification.

In the drawings I have shown only one specific form of my generic invention, but it is to be understood that I do not limit myself to such form, because my invention may be embodied in a multiplicity of forms, each being a species of my invention. It is also to be understood that by the claims succeeding the description of my invention I desire to cover the invention in whatsoever form it may be embodied. The generic type of motor disclosed herewith comprising a vibrating armature operating on the principle of a buzzer is claimed in my co-pending application S. N. 148,607 filed August 6, 1918.

In the drawings like characters are used to indicate like parts throughout the several figures thereof.

Figure 4 is a detail view illustrating an arrangement in accordance with the present invention for driving a shaft the axis of which is parallel to the path of the vibrating member when it is operating.

Figure 5 is a detail view illustrating an arrangement in accordance with the present invention for driving a shaft extending at right angles to the path of movement of the vibrating member and substantially parallel to the vibrating member while at rest.

Figure 6 is a detail view illustrating the arrangement of parts in accordance with the present invention for rotating a shaft extending at right angles to the path of vibration of the vibrating member and also at right angles to the longitudinal axis of the vibrating member.

Figure 7 is a view illustrating a simple form of the present invention for driving a pair of parallel shafts by means of a polarized oscillating armature operated by a coil or electro-magnet energized by alternating current.

Heretofore in the art of prime movers it has been customary to provide a single driving shaft and to utilize gearing not only for reducing the speed from the driving shaft, but also for obtaining rotative motion angularly disposed to the driving shaft. Where different rates of speed were desired it also was customary to obtain such varying rates of speed by introducing intermediate gears of the proper proportionate sizes. It has also been common in the art to utilize a plurality of prime movers for obtaining rotative movement in various dimensions. The introduction of intermediate gears adds to the initial expense and introduces liabilities of breakage due to a complication of parts and furthermore introduces elements which cause a very large loss of power unless the gears are very finely cut. In toys and light machinery which must be sold at low price, gears are often crude and therefore the power loss is high.

The present invention overcomes the difficulties of the prior art by providing a construction wherein a single source of power is arranged to transmit rotative movement either to single shafts or to groups of shafts disposed with their axes extending in any one of the three dimensions. Furthermore, the present invention contemplates the driving of such shafts at varying and variable speeds. For example, a plurality of shafts may be simultaneously driven with the speed of all these shafts the same; or the speed of all the shafts different; or the speed of any one or more of the shafts variable.

Figure 1:
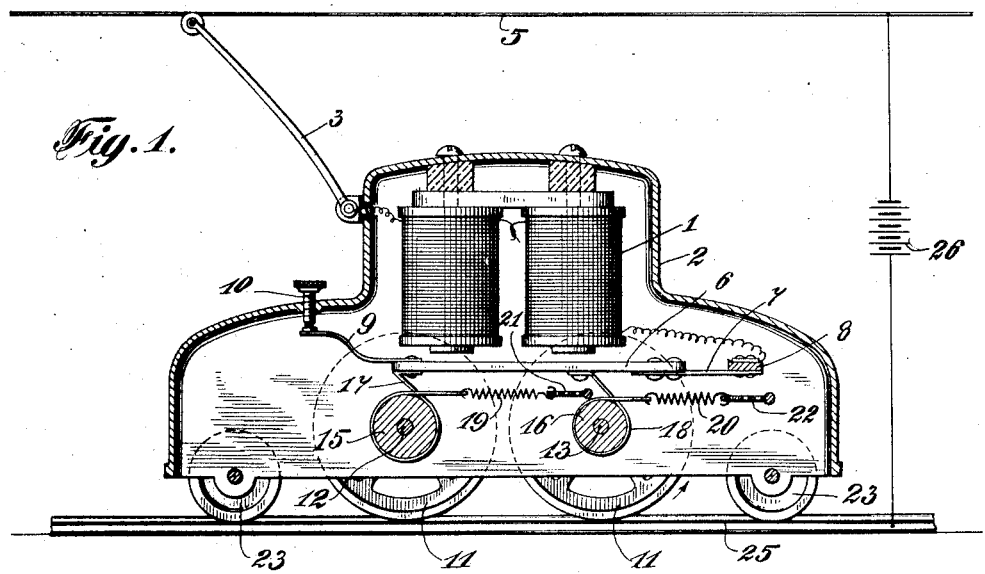
Figure 1 illustrates one embodiment of the present invention as adapted for driving a toy electric locomotive.

Referring now to the drawings and more especially to Figure 1, the motor there illustrated is adapted for a toy electric locomotive and comprises a pair of electromagnets 1, mounted in the casing 2 of the locomotive which carries a trolley pole 3 electrically connected with a trolley wire 5 and to which trolley pole one terminal of the electromagnets is connected. An armature 6 is mounted beneath the electromagnets and is supported at one end by a leaf spring 7 which is secured to an anchor 8 carried by the frame casing of the toy. The other end of the armature carries a spring contact member 9 adapted normally to make and break the current through an adjustment screw 10 carried by the casing 2. The drive wheels 11 of the locomotive are mounted upon suitable axles 12 and 13 that carry driving drums 15 and 16 around which are passed light-weight leather, linen, or cotton, tapes 17 and 18. One end of these tapes is anchored to the armature 6 and the other ends of the tapes are connected to coiled springs 19 and 20 which are adapted to be anchored in holes of suitable adjustment plates 21 and 22 which are carried by the toy casing. The driving wheels as well as the small pony wheels 23 are flanged and adapted to run on a suitable rail 25. Preferably a battery 26 is connected with one terminal to the trolley 27 and the other terminal to the rail so that current is transmitted through the wheels to the casing of the toy and through the adjustment screw to the armature, the leaf spring, and the anchor therefor, to a terminal of the electro-magnet and from the other terminal of the electro-magnet through the trolley pole to the trolley, thus completing the circuit. It will be noted from reference to Figures 1, 5 and 7 that the driving bands are angularly disposed relatively to the armatures to which these bands are connected in such manner that when the armatures vibrate the bands receive a whip-like motion such as would be imparted to a rope having one end attached to a post and the other end held in the hand and quickly moved up and down in a jerky angular relation to the length of the rope. It will be seen that as soon as the circuit is completed the electro-magnet and armature function as a buzzer. The angular disposition of the driving bands relative to the armature causes the vibration of the armature to set up waves in the bands. This causes the bands to rotate the drums, thereby driving the drive wheels. Since the band 17 farthest from the leaf spring will receive more longitudinal motion than the band 18 nearer to the leaf spring it is desirable that the circumference of the forward drum 15 be proportionately larger than that of the other drum 16 in order that both drums may have the same speed of rotation. Under the present construction it is noted that two driving shafts are independently actuated from the same source of energy.

Figure 2:
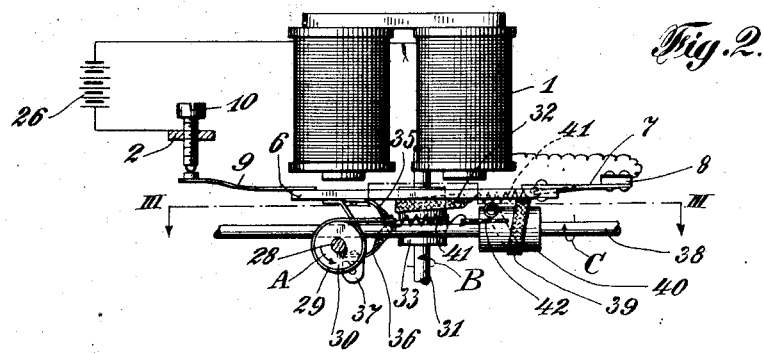
Figure 2 is a view illustrating a motor in accordance with the present invention, wherein is shown three driven shafts illustrating the possibility of simultaneously driving shafts the axes of which may extend in any of the three dimensions.
Figure 3:
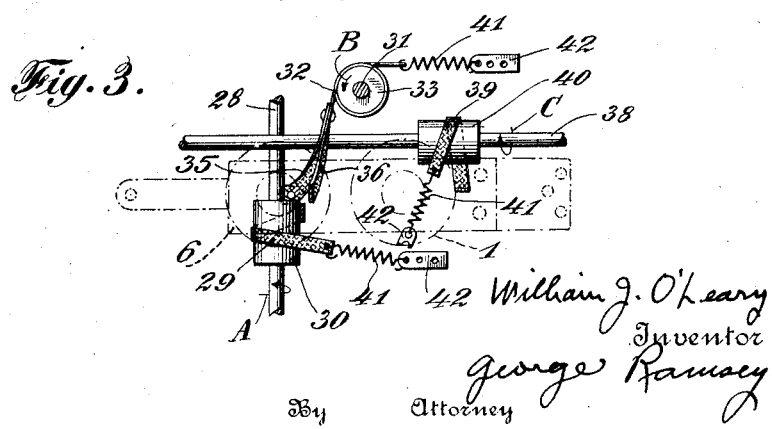
Figure 3 is a view taken on section line III in Figure 2.

Referring to Figure 2 the electrical arrangements comprising the buzzer are substantially the same as those shown in Figure 1, but the mechanical arrangement of the drive is quite different in that the forward shaft 28 is at right angles to the longitudinal axis of the armature 6 and the driving band 29 for the drum 30 on this shaft is taken off directly from the armature so that the vibration or oscillation of the armature rotates the shaft in the direction of the arrow A. The next shaft 31 is arranged with its axis at right angles to the plane of the armature and substantially parallel to the direction of oscillation of the armature and in this case the driving band 32 after passing around the drum 33 is bifurcated with one end of the fork 35 anchored to the armature and the other end of the fork 36 anchored to a fixed or stationary member 37. The oscillation or vibration of the armature alternately spreads and contracts the fork portion of the band, which action produces longitudinal waves in the operation of the band around the drum. These longitudinal waves rotate the drum so that the shaft is rotated on its vertical axis in the direction of the arrow B. The next shaft 38 is arranged on a horizontal axis substantially at right angles to the axis of the first-mentioned shaft. As in the case of the first shaft, the driving band 39 is anchored directly to the armature and is passed around the drum 40 so that the vibration of the armature causes the band to drive the drum in the direction of the arrow C. In each case it will be noted that the driving tape or band terminates in a coiled spring 41 which is secured in an opening in an anchor plate 42. By adjusting the tension of the springs the speed of the shafts may be controlled or varied. The arrangement of the bands for each of these drives for shafts extending in different directions is illustrated in detail in Figures 4, 5, and 6.

In the motors illustrated in Figures 1 and 2, wherein the electrical device is provided with a make and break, or spark gap, construction, these motors are adapted for either alternating or direct current; being adapted for direct current when the adjustment screw is arranged to permit make and break action, and being arranged for alternating current when the adjustment screw is positioned so that at substantially all times the current remains unbroken; and the vibration of the armature is then due to surges or pulsations of the magnetic forces because of the alternating current by which the magnets are energized.

Figure 7 more or less diagrammatically illustrates a type of the present invention wherein the multiple drive is secured from an oscillating armature 43 with driving bands 45 and 46 connected to each end of this armature and passing around the drums 47 and 48 to be driven. The energizing unit comprises a coil 49 which is provided with a core piece 50 and which core piece carries at each end thereof as pole pieces, permanent magnets 51 and 52 both of which have their operative faces of the same magnetic sign. The whole construction comprises a polarized magnetic construction and under these conditions and where the coil is energized by an alternating current the pole pieces will be alternately strengthened and weakened so that the alternating current will oscillate the armature and the oscillation of the armature will set up vibrations in the driving bands which therefore will drive the drums. It will be noted that when one band is tightened by oscillation of the armature, the other band is loosened; that is, when one end of the armature is moving away from one drum the other end of the armature is moving toward the other drum, so that the power strokes on the drums are in alternation. Furthermore each band has a separate tensioning member so that the speed of each drum, 47 or 48, may be independently controlled and thereby enable the respective drum speeds to be controlled without changing the vibrations or operation of the armature.

What I claim is:

1. A motor of the character specified comprising a vibrating member, means when energized capable of vibrating the said vibrating member, in combination with a plurality of driving drums, a plurality of shafts carrying said drums, the axes of said shafts being disposed at different angular relations one to another, a transmission band encircling each drum, one end of each band being attached to the vibrating member, and means for maintaining said bands in frictional engagement with the said drums 2. A motor of the character specified comprising a vibrating member, means when energized capable of maintaining said vibrating member in operation, in combination with driving drums the axes of rotation of which are angularly disposed one to another, transmission bands operatively connecting said vibrating member with the said drums whereby the vibration of said member is adapted to set up wave motions in the said bands whereby rotative motion is supplied through a single source to a plurality of angularly disposed shafts without the intermediation of gearing.

3. A motor of the character specified comprising an electrically operated buzzer, in combination with a driving drum having its axis of rotation disposed in the direction of the axis of the armature and transverse to the movement of the armature, a second driving drum with its axis of rotation at right angles to the axis of the first mentioned drum, a transmission band secured at one end to the armature and encircling said first mentioned drum, a second band secured to the armature for driving the second drum, and anchoring means for the free ends of the bands in such manner that the said drums are rotated when the buzzer is energized by a suitable current.

4. A motor of the character specified comprising an electrically operated buzzer, in combination with a plurality of driving drums, a plurality of shafts carrying said driving drums, the axes of said shafts being angularly disposed one to another and being disposed at various angles to the direction of movement of the armature of the buzzer; transmission bands secured to the armature of the buzzer and encircling said drums, and means for maintaining said bands in frictional engagement with said drums.

5. A motor of the character specified comprising an electrically operated buzzer, in combination with a plurality of driving drums having axes of rotation angularly disposed one to another, transmission bands encircling said drums and secured to the armature of the buzzer in such manner that when the buzzer is energized the vibration of the armature sets up longitudinal and transverse waves in said bands whereby said wave motion produces rotative movement in said drums to directly drive a plurality of rotating members having angularly disposed shafts and without the intermediation of gearing.

6. A motor of the character specified comprising electromagnetic means, an armature adapted to be operated by said electromagnetic means when said means is energized by suitable current, in combination with a driving drum disposed with its axis of rotation extending in the direction of movement of said armature, a transmission band encircling the said drum and having one end thereof forked with one member of the fork secured to said armature, a stationary anchor to which the other member of the form is secured in such manner that when the armature is vibrated transverse and longitudinal vibrations are set up in the portion of the band encircling the drum, and means for maintaining said band in frictional engagement with the drum.

WILLIAM J. O'LEARY.